(12) United States Patent
Jeong et al.

(10) Patent No.: US 7,981,540 B2
(45) Date of Patent: Jul. 19, 2011

(54) RECHARGEABLE BATTERY

(75) Inventors: Dong-Ho Jeong, Yongin-si (KR);
Hyung-Sik Kim, Yongin-si (KR);
Dai-Hoe Lee, Yongin-si (KR); Taek Kim, Yongin-si (KR); Seung-Wan Woo, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 999 days.

(21) Appl. No.: 11/843,874

(22) Filed: Aug. 23, 2007

(65) Prior Publication Data
US 2008/0107961 A1    May 8, 2008

(30) Foreign Application Priority Data

Nov. 2, 2006 (KR) .................. 10-2006-0107748

(51) Int. Cl.
*H01M 2/02* (2006.01)
(52) U.S. Cl. ..................................... 429/163
(58) Field of Classification Search .............. 429/163, 429/175, 185, 176
See application file for complete search history.

(56) References Cited

U.S. PATENT DOCUMENTS
6,893,773 B2 *  5/2005  Hayashi et al. ............... 429/162

FOREIGN PATENT DOCUMENTS
| JP | 11-317214 | 11/1999 |
| JP | 2001-216949 | 8/2001 |
| KR | 2006-60801 | 6/2006 |

* cited by examiner

*Primary Examiner* — Jennifer Michener
*Assistant Examiner* — Monique Wills
(74) *Attorney, Agent, or Firm* — Knobbe Martens Olson & Bear LLP

(57) ABSTRACT

A rechargeable battery including an electrode assembly, a casing which stores the electrode assembly and which includes a support to support the electrode assembly that protrudes inwardly from in an inner surface thereof, and a cap assembly which is combined with the casing and which has an electrode terminal electrically connected to the electrode assembly.

18 Claims, 7 Drawing Sheets

RECHARGEABLE BATTERY

CROSS-REFERENCE TO RELATED APPLICATIONS

This application claims the benefit of Korean Application No. 2006-107748, filed Nov. 2, 2006, in the Korean Intellectual Property Office, the disclosure of which is incorporated herein by reference.

BACKGROUND OF THE INVENTION

1. Field of the Invention

An aspect of the present invention relates to a rechargeable battery, and, more particularly, to a rechargeable battery having an improved casing structure.

2. Description of the Related Art

A rechargeable battery may be repeatedly charged and discharged while a primary battery is not rechargeable. A low capacity rechargeable battery may be used in portable miniaturized electronic devices, such as mobile phones, laptop computers, and camcorders. A large capacity battery, obtained by connecting a plurality of battery cells, may be widely used as a power supply to drive motors of movable electric apparatuses, such as hybrid electric vehicles (HEV).

The rechargeable battery (hereinafter, referred to as "a unit battery") includes an electrode assembly including positive and negative electrodes and a separator interposed therebetween, a casing in which the electrode group is stored, and a cap assembly assembled with the casing to seal the casing, having an electrode terminal that is electrically connected to the electrode assembly.

The unit battery may be cylindrical or rectangular. In the rectangular unit battery, the electrode assembly is electrically connected to the electrode terminal through a lead member. In this case, the lead member is fixed to the electrode assembly using ultrasonic welding, and the lead member is fixed to the overlying electrode terminal. Such an interconnection structure between the electrode assembly and the electrode terminal may deteriorate when the unit battery is externally impacted and the electrode assembly shakes due to the impact so that a welded portion between the electrode assembly and the lead member is damaged or broken.

When the electrode assembly is broken off from the lead member or attached to the lead member in a damaged condition, as described above, a sufficient amount of the current extracted to the electrode assembly may not flow out of the unit battery via the electrode terminal. As a result, the unit battery may not function as a power supply.

Furthermore, electrical resistance may inevitably increase in a contact area of the deteriorated interconnection between the electrode assembly and the lead member. As a result, an electrical charge/discharge efficiency of the unit battery may be degraded, and heat may be generated in the contact area that causes an increase in an internal temperature of the unit battery. As a result, the unit battery may malfunction.

Moreover, if the electrode assembly is not robustly supported in the casing, the electrode assembly may lean when the unit battery is continuously vibrated depending on an installation environment thereof. As a result, the aforementioned interconnection structure between the electrode assembly and the electrode terminal may degrade the charge/discharge efficiency as electrolyte contained in the casing cannot appropriately react.

SUMMARY OF THE INVENTION

An aspect of the invention provides a rechargeable battery having an improved casing structure by which the electrode assembly is robustly supported in the casing.

According to an aspect of the invention, there is provided a rechargeable battery comprising: an electrode assembly including a positive electrode, a negative electrode and a separator interposed therebetween; a casing which stores the electrode assembly and which includes a support to support the electrode assembly that protrudes inwardly from an inner surface thereof; and a cap assembly which is combined with the casing and which has an electrode terminal electrically connected to the electrode assembly.

The casing may include a body having first and second faces oppositely disposed, and the support may be provided in the first and second faces. The electrode assembly may include uncoated portions where activation material does not coat the electrodes, and the support may be combined with the uncoated portions to support the electrode assembly. The uncoated portions may overlap with each other, and the support may be inserted between the uncoated portions.

An opposite surface of the protruded support may be hollow, and an opening of the hollow may be exposed toward an exterior of the casing. The support may have a solid protrusion fixed in the inner surface. The support may have an insulator to electrically insulate the electrode assembly from the casing.

The rechargeable battery may be rectangular, and the support may be provided in facing inner surfaces of the casing. The support may include a plurality of support pieces attached to the inner surface with a predetermined interval, and the electrode assembly may be fitted in a space between the support pieces.

The casing may have a box-shaped body having an opening, and the support pieces may be disposed in parallel on the inner surface of the casing in such a way that upper ends of the support pieces are slanted and widened toward the opening of the casing.

The electrode assembly may include uncoated portions where activation material does not coat the electrodes and the uncoated portions may be disposed adjacent to the inner surface of the casing. The rechargeable battery may further comprise a lead member connected to the electrode assembly and the electrode terminal, and the support may be disposed farther than the lead member from the electrode terminal.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
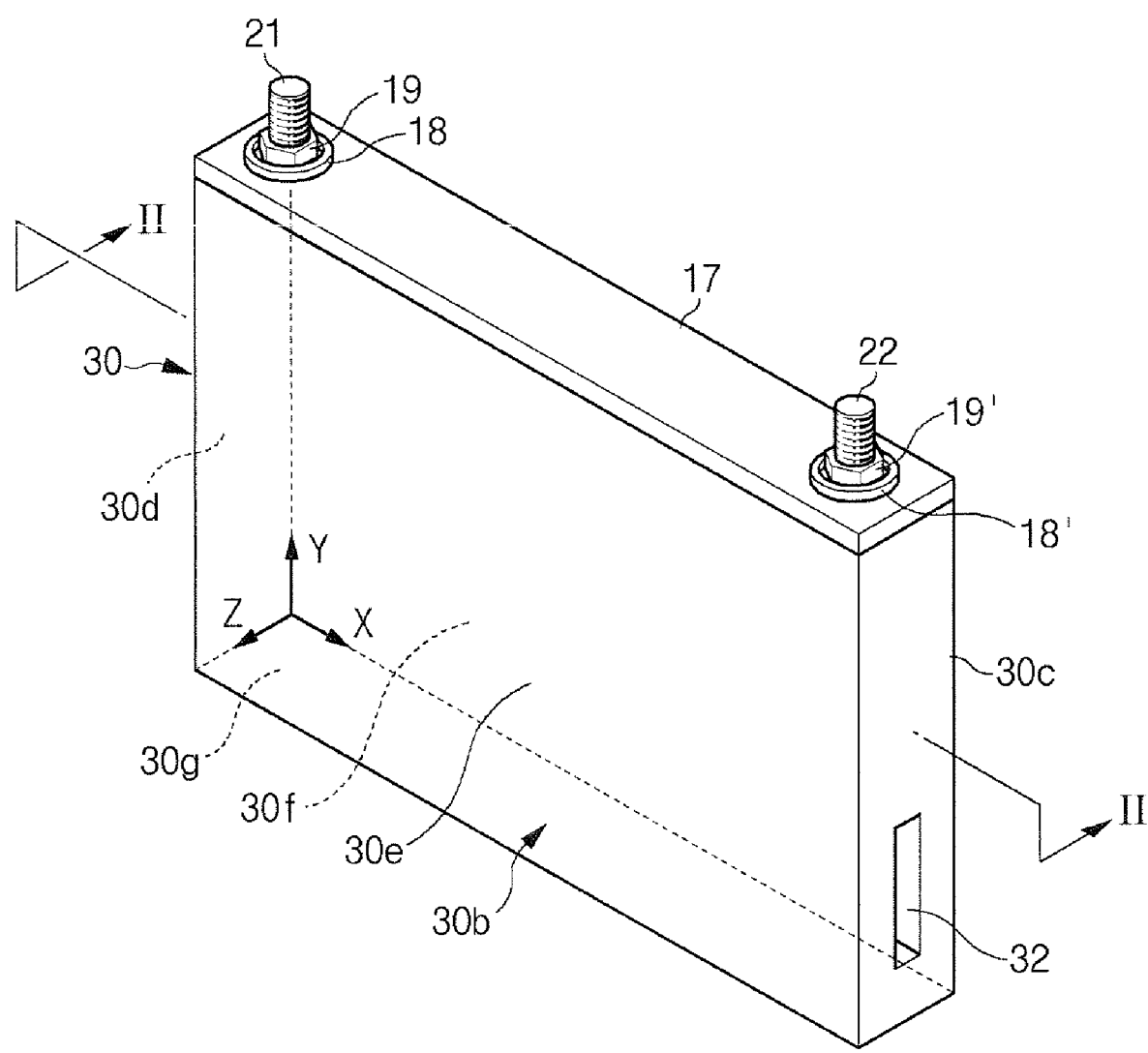
FIG. 1 is a perspective view illustrating a rechargeable battery according to a first embodiment of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
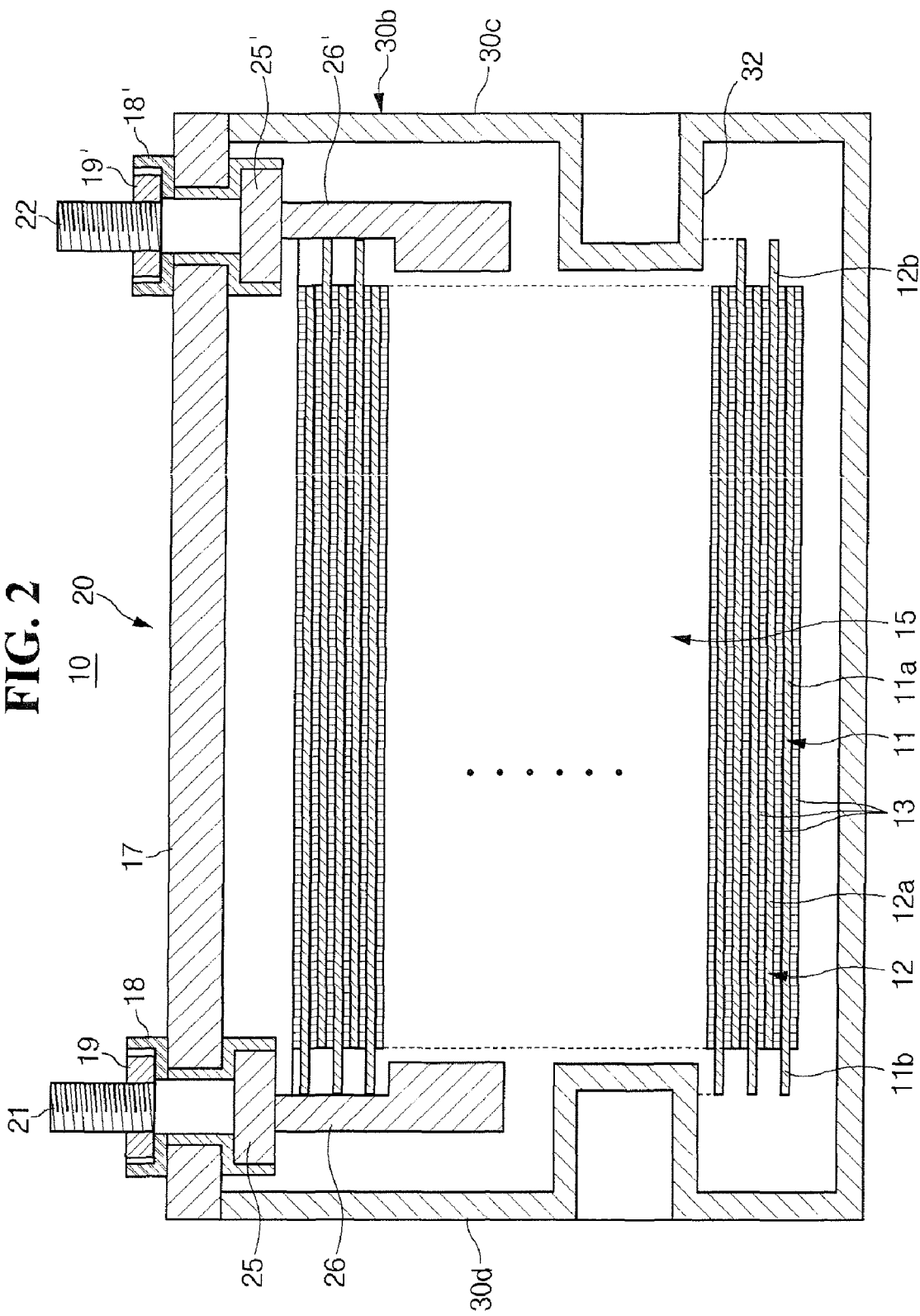
FIG. 2 is a cross-sectional view across a line II-II of FIG. 1.

FIG. 1 is a perspective view illustrating a rechargeable battery (hereinafter, referred to as a unit battery) according the first embodiment of the invention, and FIG. 2 is a cross-sectional view across a line II-II of FIG. 2. As shown in FIGS. 1 and 2, the unit battery 10 includes an electrode assembly 15 having positive and negative electrodes 11 and 12 and an insulating separator 13 interposed therebetween, and a casing 30 having a box-shaped body 30b and an opening 30a in one side thereof to store the electrode assembly 15. The unit battery according to this embodiment has a rectangular shape although other shapes, such as cylinders, are possible. Accordingly, the body 30b of the casing 30 is hollow and has an opening 30a in the one side. The casing 30 includes a first face 30c, a second face 30d, a third face 30e, a fourth face 30f, and a bottom face 30g.

A cap plate 17 to seal the casing 30 is installed in the opening 30a of the casing 30. The cap plate 17 has positive and negative terminals 21 and 22 electrically connected to the electrode assembly 15. The cap plate 17 and the positive and negative electrode terminals 21 and 22 constitute a cap assembly. The casing 30 may be formed of conductive metal such as aluminum, aluminum alloy, and nickel-plated steel or non-conductive material having an electrical insulation property.

The positive and negative electrodes 11 and 12 each includes coated portions 11a and 12a where activation material is coated on a charge collector that comprises a thin metal foil and uncoated portions 11b and 12b where the activation material is not present as a coating. The electrode assembly 15, according to embodiments of the present invention, is formed by winding and pressing the positive electrode 12, a separator 13 and the negative electrode 11 into a rectangular shape. In this state, the uncoated portions 11b and 12b are oppositely disposed in both ends of the electrode assembly 15. In addition, the uncoated portions 11b and 12b are exposed externally.

Lead members 26 and 26' connected to the positive and negative electrodes 21 and 22 are provided in the uncoated portions 11b and 12b. The lead members 26 and 26' are partially inserted into the uncoated portions 11b and 12b and fixed (i.e., welded) to the uncoated portions 11b and 12b. In addition, the lead members 26 and 26' are fixed to flanges 25 and 25' under the positive and negative electrodes 21 and 22. The positive and negative electrodes 21 and 22 protrude from the casing through a hole provided in the cap plate 17. Gaskets 18 and 18' are installed between the cap plate 17 and the positive and negative electrodes 21 and 22 to provide electric insulation. The nuts 19 and 19' engaged with the positive and negative electrodes 21 and 22, respectively, which protrude from the casing 30, so that the positive and negative electrodes 21 and 22 are fixable with respect to the cap plate 17. The first and second faces 30c and 30d of the casing 30 have a support 32 that protrudes inwardly to support the electrode assembly 15.

Figure 3:
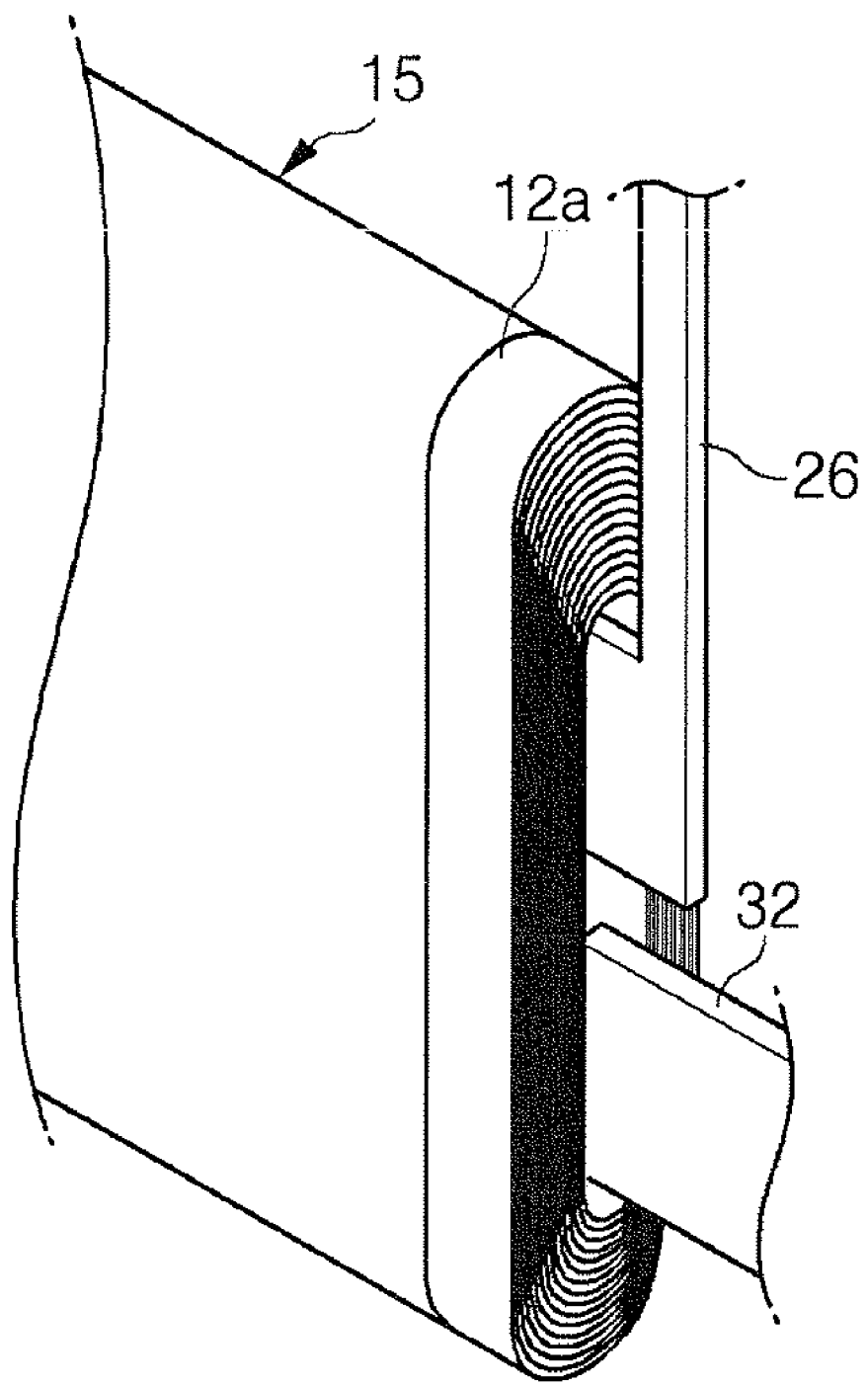
FIG. 3 is a perspective view illustrating an electrode assembly according to the first embodiment of the invention and a lead member and a support installed therein.

As shown in FIG. 3, the support 32 is inserted between the uncoated portions 11b and 12b of the windings of the electrode assembly 15 to support the electrode assembly 15 and to prevent the electrode assembly 15 from undesirably joggling horizontally. Lead members 26 and 26' are also inserted into the center of the electrode assembly 15. The support 32 is inserted into the center of the electrode assembly 15 under the lead members 26 and 26'. Accordingly, the electrode assembly 15 is supported by the lead members 26 and 26' in an upper portion thereof and is supported by the support 32 in a lower portion thereof. As such, the electrode assembly 15 is prevented from being relatively easily joggled.

Figure 4:
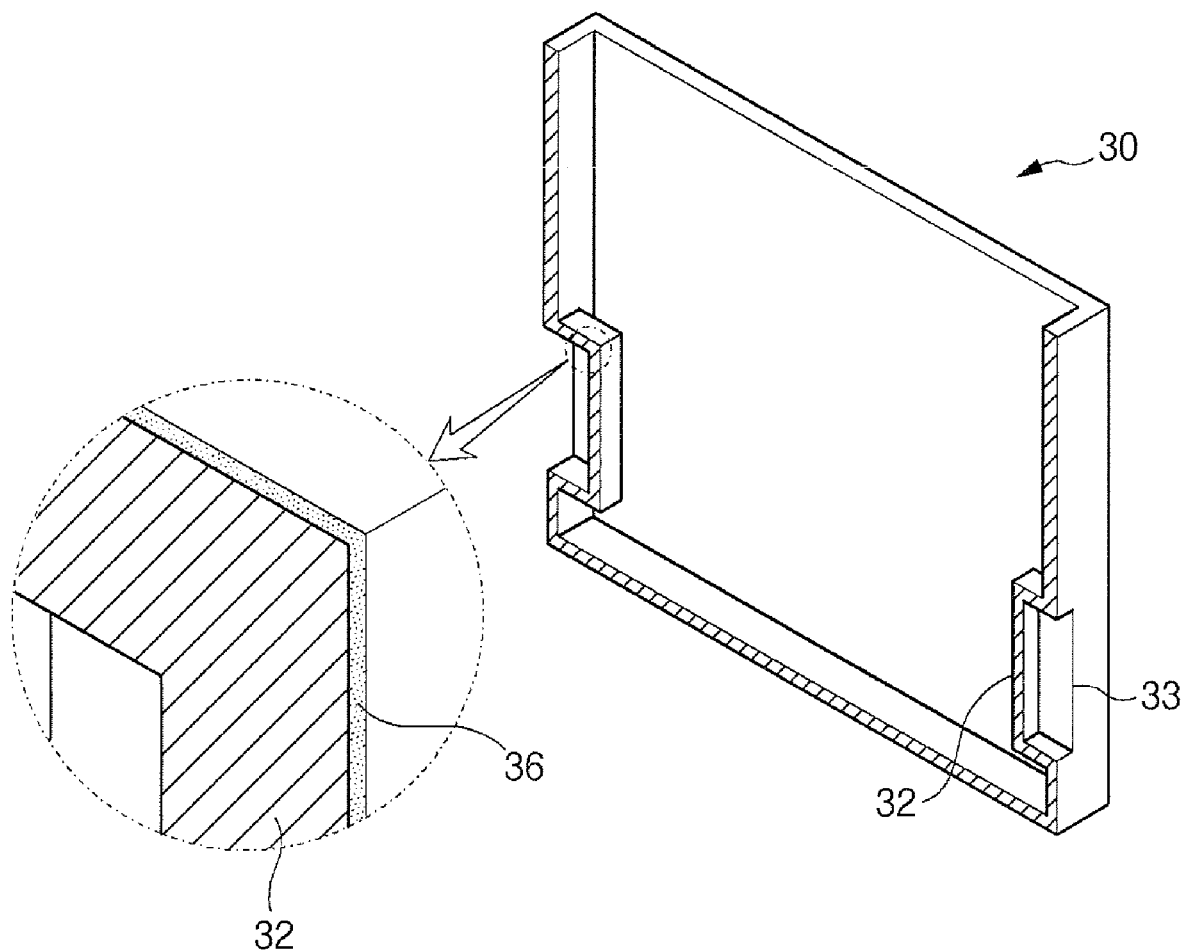
FIG. 4 is a cross-sectional perspective view illustrating a casing installed in a rechargeable battery according to the first embodiment of the invention.

As shown in FIG. 2, the support 32 is formed in the first and second faces 30c and 30d of the casing 30 at a position that is adjacent to the uncoated portions 11b and 12b. As shown in FIG. 4, the support 32 may have an inwardly sunken step structure. Accordingly, the external face of the inward protrusion of the support 32 appears hollow with an opening 33 that is exposed externally. In addition, an insulator 36 is provided on the inner surface of the support 32. The insulator may comprise a film and provides insulation between the electrode assembly 15 and the casing 30. The insulator 36 may be formed of a polymer resin film or an aluminum oxide film. Although the insulator 36 has a film shape in the present embodiment, according to other embodiments of the invention, the insulator 36 may be embodied in various shapes, such as a coating.

According to the present embodiment, the support 32 is formed in both side faces 30c and 30d of the casing 30 in an inwardly protruded step structure. Therefore, the electrode assembly 15 is relatively safely supported and protected from external impacts. Since the support 32 directly supports the uncoated portions 11b and 12b, relatively safely preventing damage from external impacts in the welded portion between the lead members 26 and 26' and the electrode assembly 15 is possible. In addition, since the support 32 is inserted between the uncoated portions 11b and 12b, the electrode assembly 15 may be supported in a width direction (i.e., a X-axis direction of FIG. 1) and a thickness direction (i.e., a Y-axis direction of FIG. 1) of the casing 30.

Figure 5:
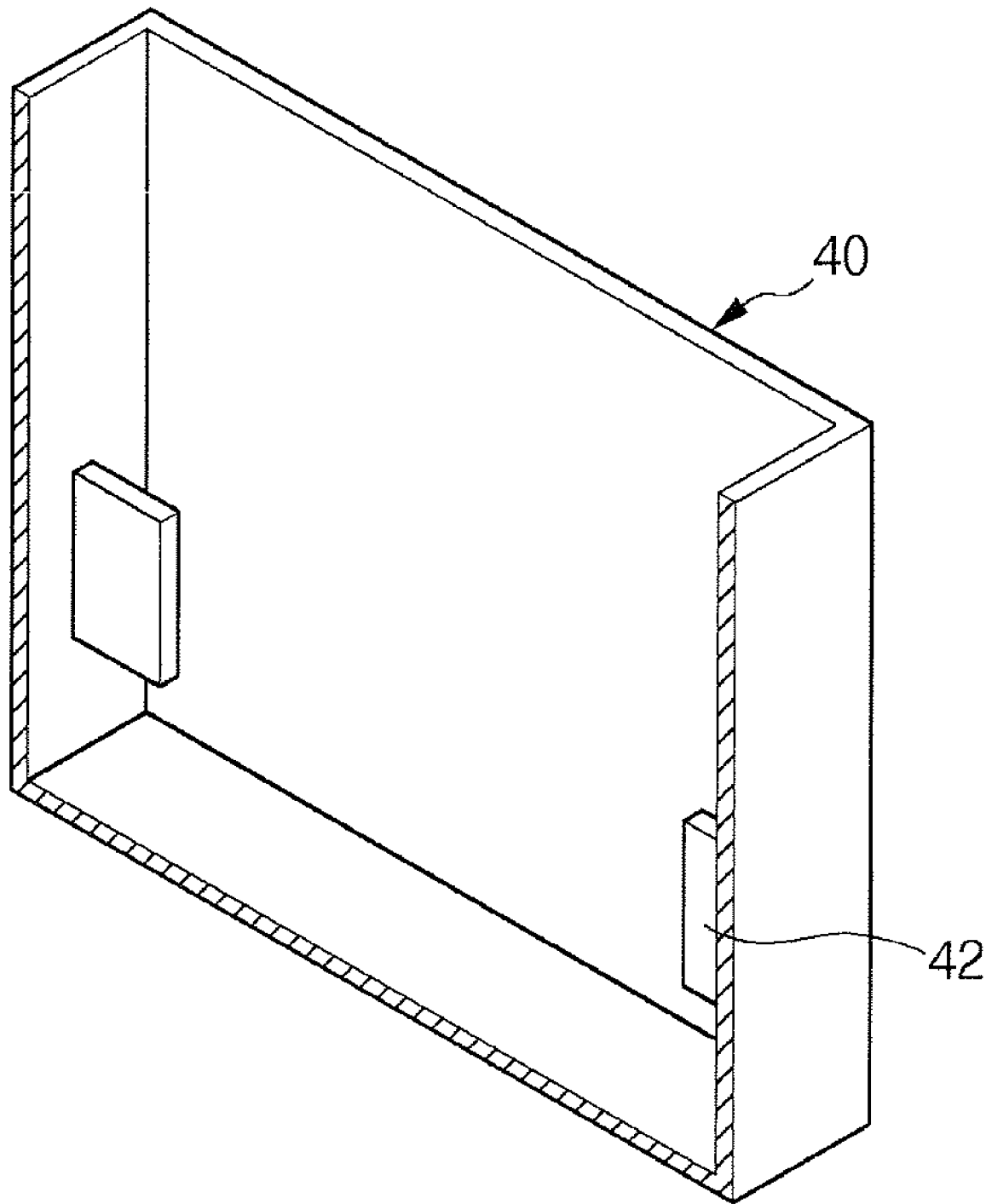
FIG. 5 is a cross-sectional perspective view illustrating a casing installed in a rechargeable battery according to a second embodiment of the invention.

FIG. 5 is a cross-sectional perspective view illustrating a casing of a rechargeable battery according to a second embodiment of the invention. As shown in FIG. 5, the casing 40 includes a support 42 fixed to the inner surface of the casing 40 in order to support the electrode assembly 15. The support 42 comprises a thin plate that may be inserted into the center of the electrode assembly 15, and which is fixed to the inner surface of the casing 40 using an adhesive or welding. The support 42 may be a polymer that is capable of providing electrical insulation.

When the support 42 is fixed to the inner surface of the casing 40, the support 42 may be formed of insulation material that is different from that of the casing 40. Accordingly, there is no need to insert a separate insulator between the support 42 and the electrode assembly 15. Since the support 42 separates the electrode assembly 15 from the casing 40, prevention of a short circuit between the casing 40 and the electrode assembly 15 is possible.

Figure 6:
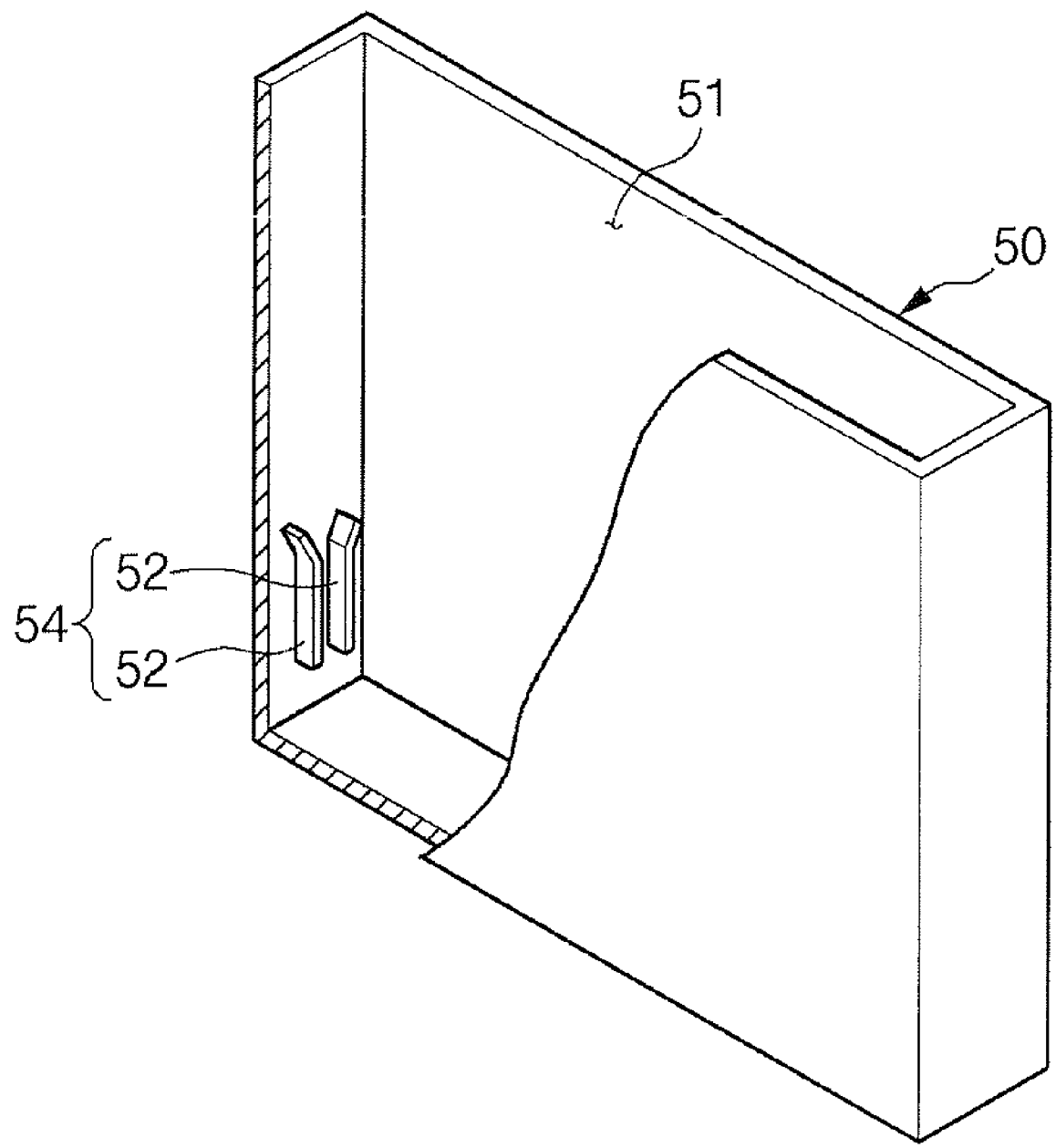
FIG. 6 is a cross-sectional perspective view illustrating a casing installed in a rechargeable battery according to a third embodiment of the invention.

FIG. 6 is a cross-sectional perspective view illustrating a casing of a rechargeable battery according to the third embodiment of the invention. As shown in FIG. 6, the casing 50 includes a support 54 attached to the inner surface of the casing 50 so that the electrode assembly 15 may be fitted therein. The support 54 comprises two support pieces 52 that are arranged in parallel with each other and at a distance from one another that corresponds to a thickness of the electrode assembly 15 so that the electrode assembly 15 may be fitted therein. In addition, the upper ends of the support pieces 52 are slanted and widened toward the opening 51 of the casing 50 so that the electrode assembly 15 may be smoothly inserted into a space between the support pieces 52.

Figure 7:
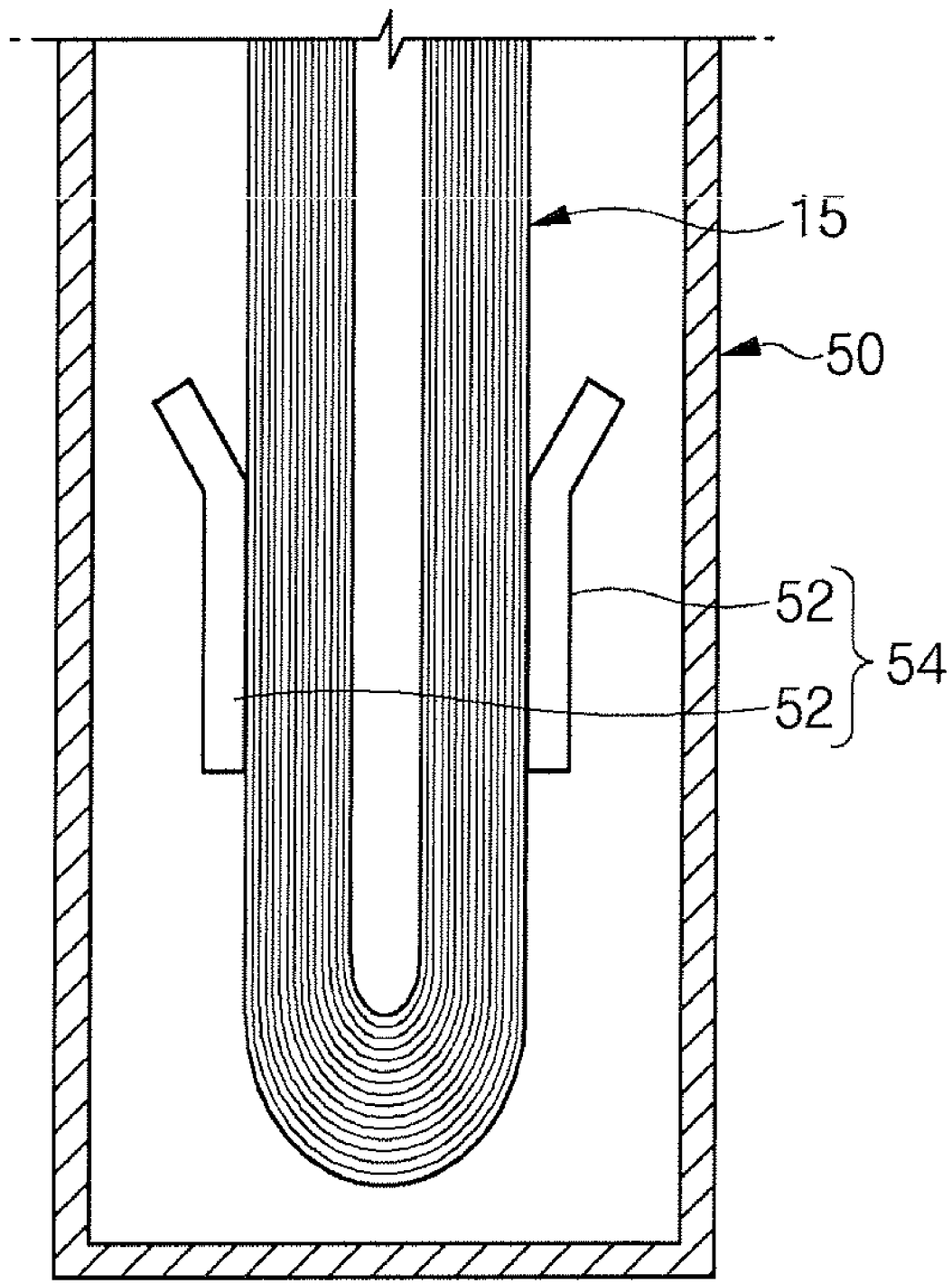
FIG. 7 is a cross-sectional view illustrating an electrode assembly combined with a support of a rechargeable battery according to the third embodiment of the invention.

FIG. 7 illustrates the electrode assembly 15 being fitted in the support 54. According to the present embodiment, the support 54 supports both end faces of the electrode assembly 15 to prevent a joggle of the electrode assembly that is caused by external impact. In addition, since the electrode assembly 15 is fitted and fixed in the support 54, prevention of the electrode assembly from leaning to one side due to the vibration is possible.

According to the aforementioned embodiments, since the support structure supports the electrode assembly, prevention of a joggle caused by external impacts to the electrode assembly is possible. Accordingly, providing safe interconnections between the electrode assembly and the lead member is possible. In addition, since the support is inserted between the uncoated portions to fix the electrode assembly, safely supporting the electrode assembly in a width direction and a thickness direction of the casing is possible. Furthermore, since the electrode assembly is fitted in the support, prevention of the electrode assembly from leaning to one side due to vibration is possible.

In accordance with aspects of the present invention, the rechargeable battery may be embodied in various forms, such as a nickel cadmium (Ni—Cd) battery, a nickel hydride (Ni-MH) battery, or a lithium rechargeable battery, such as a lithium (Li) polymer battery or a lithium ion (Li-ion) battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A rechargeable battery comprising:
an electrode assembly including a positive electrode, a negative electrode and a separator interposed therebetween;
a casing which stores the electrode assembly;
a protrusion to support the electrode assembly, wherein the protrusion protrudes inwardly from an inner surface of the casing;
a cap assembly which is combined with the casing and which has an electrode terminal electrically connected to the electrode assembly;
wherein at least part of the electrode assembly is rolled around the protrusion,
wherein the electrode assembly includes uncoated portions at which the electrodes are not coated by an activation material,
wherein at least some of the uncoated portions overlap with each other, the protrusion being inserted between the overlapped uncoated portions, and
wherein the protrusion comprises an insulator to electrically insulate the electrode assembly from the casing.

2. The rechargeable battery according to claim 1, wherein the casing comprises a body having first and second opposing faces, the first and second opposing faces each having an inner surface, and wherein the battery comprises a protrusion from the inner surface of each of the opposing faces.

3. The rechargeable battery according to claim 1, wherein the protrusion is combined with the uncoated portions to support the electrode assembly.

4. The rechargeable battery according to claim 1, wherein the protrusion is hollow.

5. The rechargeable battery according to claim 4, wherein an opening of the hollow protrusion is exposed toward an exterior of the casing.

6. The rechargeable battery according to claim 1, wherein the protrusion is solid.

7. The rechargeable battery according to claim 1, wherein the rechargeable battery is rectangular, and a protrusion is further provided on another inner surfaces opposing the inner surface of the casing.

8. A rechargeable lithium ion battery, comprising:
an electrode assembly stored in an enclosed casing, the electrode assembly comprising a laminated structure comprised of a positive electrode, a negative electrode and a separator therebetween;
first and second protrusions which protrude from a single inner surface of the casing;
wherein the first and second protrusions have surfaces facing one another and wherein at least a part of the laminated structure is interposed between the facing surfaces of the protrusions protruding from the single inner surface of the casing.

9. The rechargeable lithium ion battery according to claim 8, wherein the protrusions provide support to an area generally located at the center of the electrode assembly.

10. The rechargeable lithium ion battery according to claim 8, wherein the protrusions provide support to sides of the electrode assembly when viewed in a width direction.

11. The rechargeable battery according to claim 8, wherein the protrusion includes a plurality of protrusion pieces attached to the inner surface, each of the protrusion pieces being separated from one another by a predetermined interval.

12. The rechargeable battery according to claim 10, wherein the electrode assembly is fitted in a space between the protrusion pieces.

13. The rechargeable battery according to claim 10, wherein the casing comprises a box-shaped opened body.

14. The rechargeable battery according to claim 13, wherein the protrusion pieces are disposed in parallel with each other on the inner surface of the casing such that upper ends of the protrusion pieces are each slanted and widened toward the opening of the casing.

15. The rechargeable battery according to claim 13, wherein the protrusion pieces comprise upper and lower portions, the upper portions being disposed in parallel with each other and the upper portions being slanted and widened toward the opening of the casing.

16. The rechargeable battery according to claim 8, wherein the electrode assembly comprises uncoated portions at which the electrodes are uncoated by activation material.

17. The rechargeable battery according to claim 16, wherein the uncoated portions are disposed at positions that are adjacent to the inner surface of the casing.

18. The rechargeable battery according to claim 8, further comprising a lead member connected to the electrode assembly and the electrode terminal, the protrusion being disposed farther from the electrode terminal than the lead member.

* * * * *

UNITED STATES PATENT AND TRADEMARK OFFICE
CERTIFICATE OF CORRECTION

PATENT NO. : 7,981,540 B2  
APPLICATION NO. : 11/843874  
DATED : July 19, 2011  
INVENTOR(S) : Dong-Ho Jeong et al.

Page 1 of 1

It is certified that error appears in the above-identified patent and that said Letters Patent is hereby corrected as shown below:

At column 6, line 13, Claim 7, please delete "surfaces", and insert -- surface --, therefor.

At column 6, line 23, Claim 8, please delete "another" and insert -- another, --, therefor.

Signed and Sealed this  
First Day of May, 2012

David J. Kappos  
*Director of the United States Patent and Trademark Office*